United States Patent [19]
Wiedeman et al.

[11] Patent Number: 5,905,943
[45] Date of Patent: May 18, 1999

[54] SYSTEM FOR GENERATING AND USING GLOBAL RADIO FREQUENCY MAPS

[75] Inventors: Robert A Wiedeman, Los Altos; Vijaya K Gallagher, San Jose; John A Serri, Saratoga, all of Calif.

[73] Assignee: Globalstar L.P., San Jose, Calif.

[21] Appl. No.: 08/840,370

[22] Filed: Apr. 29, 1997

[51] Int. Cl.$^6$ .................................................. H04Q 7/20
[52] U.S. Cl. ......................... 455/11.1; 455/13.4; 455/427
[58] Field of Search ............................ 455/11.1, 12.1, 455/13.4, 422, 427, 429, 430, 450, 452, 454

[56] References Cited

U.S. PATENT DOCUMENTS

| | | | |
|---|---|---|---|
| Re. 32,905 | 4/1989 | Baran ....................................... | 370/320 |
| 4,901,307 | 2/1990 | Gilhousen et al. ...................... | 370/320 |
| 5,010,317 | 4/1991 | Schwendeman et al. ............ | 340/311.1 |
| 5,073,900 | 12/1991 | Mallinckrodt ........................... | 375/200 |
| 5,081,703 | 1/1992 | Lee ......................................... | 455/13.1 |
| 5,109,390 | 4/1992 | Gilhousen et al. ..................... | 375/200 |
| 5,119,225 | 6/1992 | Grant et al. ............................ | 359/172 |
| 5,216,427 | 6/1993 | Yan et al. .............................. | 342/352 |
| 5,233,626 | 8/1993 | Ames ..................................... | 375/200 |
| 5,239,671 | 8/1993 | Linquist et al. ........................ | 455/13.1 |
| 5,265,119 | 11/1993 | Gilhousen et al. ..................... | 370/335 |
| 5,303,286 | 4/1994 | Wiedeman .............................. | 455/428 |
| 5,339,330 | 8/1994 | Mallinckrodt ........................... | 375/200 |
| 5,410,728 | 4/1995 | Bertiger et al. ........................ | 455/13.1 |
| 5,415,368 | 5/1995 | Horstein et al. ..................... | 244/158 R |
| 5,422,647 | 6/1995 | Hirshfield et al. ...................... | 342/354 |
| 5,433,726 | 7/1995 | Horstein et al. ..................... | 244/158 R |
| 5,439,190 | 8/1995 | Horstein et al. ........................ | 244/158 |
| 5,446,756 | 8/1995 | Mallinckrodt ........................... | 375/200 |
| 5,448,623 | 9/1995 | Wiedeman et al. .................... | 455/430 |
| 5,551,624 | 9/1996 | Horstein et al. ..................... | 244/158 R |
| 5,590,395 | 12/1996 | Diekelman ............................. | 455/13.1 |
| 5,619,525 | 4/1997 | Wiedeman et al. .................... | 375/200 |
| 5,768,684 | 6/1998 | Grubb et al. .......................... | 455/13.4 |

FOREIGN PATENT DOCUMENTS

| | | |
|---|---|---|
| 0 421 698 A2 | 10/1991 | European Pat. Off. . |
| WO 90/13186 | 11/1990 | WIPO . |
| WO 91/09473 | 6/1991 | WIPO . |

OTHER PUBLICATIONS

Petition of American Mobile Satellite Corporation Before the FCC, Washington, DC 20554, dated Jun. 3, 1991, pp. 1–15.

Application of Motorola Satellite Communications, Inc. for IRIDIUM A Low Earth Orbit Mobile Satellite System before the FCC, Washington, D.C. Dec. 1990, pp. 49–96.

Before the FCC, Washington, D.C. 20554, ARIES CONSTELLATION Low Earth Orbit Satellite System Proposal of Constellation Communications, Inc. Jun. 3, 1991, Appendix A, B, and C.

Application of TRW Inc. for Authority to Construct a New Communications Satellite SYSTEM ODYSSEY$^{SM}$ before the FCC, Washington, D.C. 20554, May 31, 1991 pp. 33–51.

(List continued on next page.)

*Primary Examiner*—Dwayne D. Bost
*Assistant Examiner*—William G. Trost
*Attorney, Agent, or Firm*—Perman & Green, LLP

[57] ABSTRACT

A method for defining a radio frequency map to be used to isolate negative effects of undesirable radio frequency emitters on radio device communications handheld and stationary. The method includes the steps of measuring C-band power corresponding to an L-band beam as part of an L-band footprint of a communication satellite, calculating various identifiable interference errors associated with the signal transmission path, and subtracting the interference errors from the original C-band power measurement resulting in a power value corresponding to undesirable radio frequency emitter interference at the location of the L-band beam. The resultant radio frequency map can then be used to reallocate frequency channels of operation used by radio devices, mobile phones for example, resulting in power savings in the radio device while maintaining a suitable signal-to-noise ratio.

12 Claims, 5 Drawing Sheets

OTHER PUBLICATIONS

Application of Ellipsat Corporation ELLIPSAT for the Authority to Construct ELLIPSO$^R$I An Elliptical Orbit Satellite System, before the FCC, Washington, D.C. 20554, Nov. 2, 1990, pp. 5–34.

Application of Loral Cellular Systems, Corp., Globalstar Mobile COmmunications Wherever You Are, before the FCC, Washington, D.C. Jun. 3, 1991, pp. 94–187.

"An Integrated Satellite–Cellular Land Mobile System for Europe", E. Del Re, University of Florence, Dept. of Electronics Engineering, italy, Sep. 21, 1989.

"Current and Future Mobile Satellite Communication Systems", S. Kato et al., IEICE Transactions, vol. F 74, No. 8 Aug. 1991, pp. 2201–2210.

"Digital Network Oriented Mobile Radio Satellite System as an Integrated Part of The GSM Cellular Radio System in Europe", P. Dondl, Deutsch BUndespost/Fernmeldetechniches Zentralmt/Darmstadt, Sep. 21, 1989 Fed. Rep. Germ.

"The OmniTRACS$^R$ Mobile Satellite Communications and Positioning System", E. Tiedemann, Jr. et al., Vehicle Electronics in the 90's: Proceedings of the In'l. Congress on Transporation Electronics, Oct. 1990.

"Software Implementation of a PN Spread Spectrum Receiver to Accommodate Dynamics", C. Cahn et al., IEEE Trans, on Comm., vol. COM–25, No. 8, Aug. 1977.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium™$^1$ System—A Revolutionary Satellite Communications System Developed with Innovative Applications of Technology", D. Sterling et al., IEEE, MILCOM 1991, Nov. 4–7.

"Iridium: Key to Worldwide Cellular Communications", J. Foley, Telecommunications, Oct. 1991, pp. 23–28.

SYSTEM FOR GENERATING AND USING GLOBAL RADIO FREQUENCY MAPS

FIELD OF THE INVENTION

This invention pertains to satellite communications and to mobile satellite communications in particular.

BACKGROUND OF THE INVENTION

The microwave radio frequency (RF) spectrum is extremely congested due to the rapid growth of various RF system applications. The performance of a given RF system is degraded by radio frequency interference (RFI). Constellations of satellites, whose field of view encompasses the entire globe, are currently used to allow communication between radio devices or radio receivers throughout the world. These constellations can be either in geostationary synchronous orbits (GSO) or non-geostationary synchronous orbits (non-GSO), also called low-earth and medium-earth orbits.

Several low-earth orbit mobile satellite systems have been proposed and at least one, which uses code division multiple access (CDMA), is expected to be deployed in the 1998/99 time frame. It will provide global coverage for hand-held and mobile user terminals (UT). This system will use L-band (1610–1626 MHz) for UT-satellite links, S-band (2485–2500 MHz) for satellite-UT links, and C-band (about 5 GHz) for satellite-to-gateway and gateway-to-satellite links.

One problem with satellite communication systems is directly related to the increased use due to new RF system applications. New RF systems compete with existing systems for available bandwidth. Over the past several years, for example, mobile phone use has increased dramatically putting a heavier burden on current satellite communication systems.

OBJECTS OF THE INVENTION

A first object of this invention is to produce a radio frequency map of the globe, utilizing a constellation of communication satellites, either non-geostationary orbit or geostationary orbit satellites, or a combination of both.

A second object of this invention is to provide for a more efficient satellite communication system by reallocating user terminal RF channels, eliminating the effects of undesirable signals from the desirable user terminal transmission signals and reducing the power required by the user terminal to communicate with the satellite communication system.

SUMMARY OF THE INVENTION

The foregoing and other problems are overcome and the objects of the invention are realized by methods and apparatus in accordance with embodiments of this invention, wherein a method is disclosed for generating a radio frequency interference map. The method includes the steps of measuring C-band power corresponding to an L-band beam as part of an L-band footprint of a communication satellite, calculating various identifiable interference errors associated with the signal transmission path, and subtracting the interference errors from the original C-band power measurement resulting in a power value corresponding to unknown and undesirable radio frequency emitter interference at the location of the L-band beam. The resultant radio frequency map can then be used to reallocate frequency channels of operation used by radio devices, resulting in power savings in the radio device while maintaining a suitable signal-to-noise ratio.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
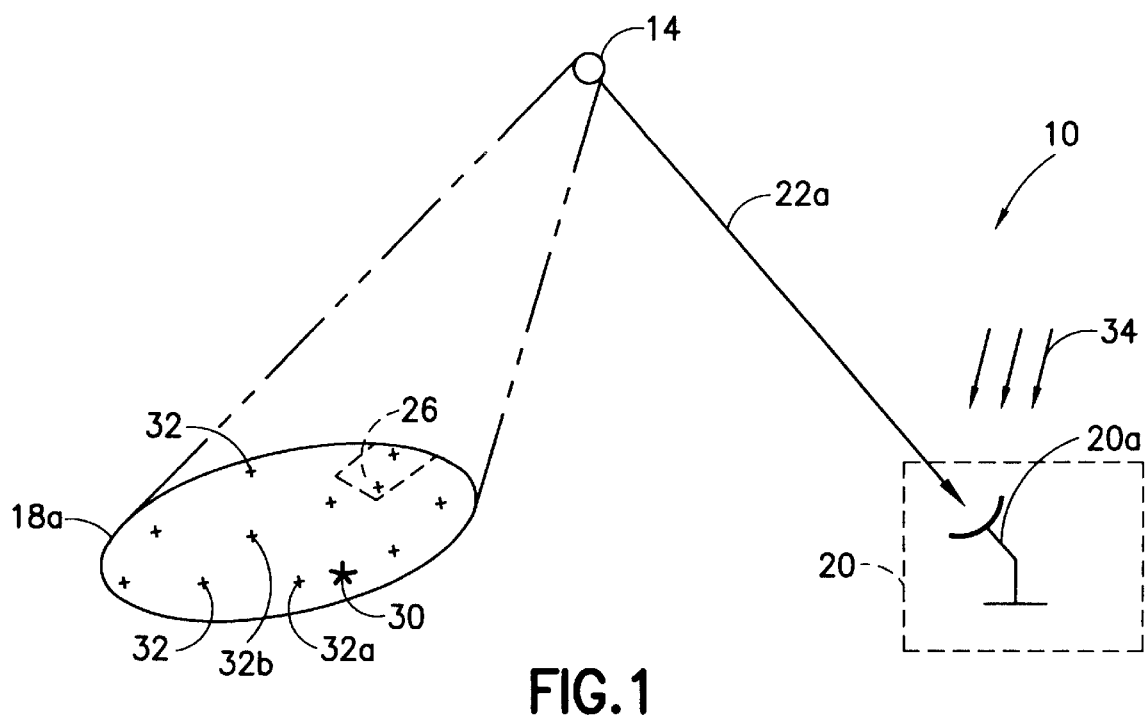
FIG. 1 depicts the geometry of a radio frequency map generating system in accordance with this invention.

A satellite constellation designed primarily to provide mobile satellite service (MSS), such as the one that is currently being developed and expected to be operational in 1998 or 1999, is used to produce an RF map of the globe at certain frequencies. Such a map is useful for operators of present and future RF systems, both terrestrial and satellite-based, in determining techniques for mitigation of RFI. In a preferred embodiment the defined radio frequency map is used to optimize resource allocation in the MSS system. Such an RF map could also be used by standards bodies for determining compliance with local or global RF emissions standards. Additionally, the global RF maps could be of use to physical and environmental scientists. At present, information on RFI in various frequency bands is either unknown and/or localized, especially in some countries where the regulatory and licensing procedures for RF systems are less strict.

A presently preferred embodiment of an RF mapping system employs a constellation of low earth orbit (LEO) satellites that communicate through one or more terrestrial gateways. The individual gateways are each bidirectionally coupled to one or more terrestrial communication systems, such as the local Public Switched Telephone Network (PSTN), as well as to private and public data and voice networks.

The following U.S. Patents teach various aspects of a LEO satellite constellation, and the associated communication system, which may be used to practice this invention: U.S. Pat. No. : 5,422,647, issued Jun. 6, 1995, entitled "Mobile Communication Satellite Payload", by E. Hirshfield and C. A. Tsao; U.S. Pat. No. : 5,504,493, issued Apr. 2, 1996, entitled "Active Transmit Phased Array Antenna with Amplitude Taper", by E. Hirshfield; U.S. Pat. Nos. 5,448,623, issued Sep. 5, 1995, and 5,526,404, issued Jun. 11, 1996, "Satellite Telecommunications system Using Network Coordinating Gateways Operative with a Terrestrial Communication System", by R. A. Wiedeman and P. A. Monte; U.S. Pat. No. 5,233,626, issued Aug. 3, 1993, entitled "Repeater Diversity Spread Spectrum Communication System", by S. A. Ames; and U.S. Pat. No. : 5,552,798, issued Sep. 3, 1996, entitled "Antenna for Multipath Satellite Communication Links", by F. J. Dietrich and P. A. Monte. The disclosures of these various U.S. Patents are incorporated by reference herein in their entireties.

As will be made evident below, the teaching of this invention is not restricted for use with LEO satellite systems, but may be practiced as well using medium earth orbit (MEO) and geo-synchronous orbit (GSO) satellite systems. The teachings of this invention are also not limited for use with CDMA systems, as TDMA systems can benefit as well. In general, the teachings of this invention apply to systems wherein a reduction in interference is beneficial regardless of the employed modulation and access scheme.

In one embodiment, the invention enables RF mapping of the 1610–1626.5 MHz frequency band using the C-band feederlink. However the same principle can be applied to RF mapping of the world using other GSO or non-GSO satellite constellations operating in other frequency bands, using feederlinks in the same or other frequency bands.

Referring to FIG. 1, the geometry of a global radio frequency map generating system 10 in accordance with this invention is shown. In general, the system 10 comprises a gateway 20 and a non-GSO satellite 14. The gateway 20 further comprises several high-gain antennas, such as an antenna 20a which communicates with the satellite 14. The satellite 14 is positioned such that it has an operational zone of coverage defined by an L-band footprint 18a. Typically the L-band footprint 18a is comprised of a plurality of individual beams 26. At any given time there may exist one or more desired signal sources each represented as a user terminal 32 and one or more L-band emitters 30 within the L-band footprint 18a, each of which whose position may or may not be dynamically changing. For example, the user terminal 32 may be a mobile radio device 32a (not shown) or a stationary radio device 32b (not shown). The satellite 14 communicates with the antenna 20a, and ultimately with the gateway 20, through a feederlink signal 22a.

Figure 6:
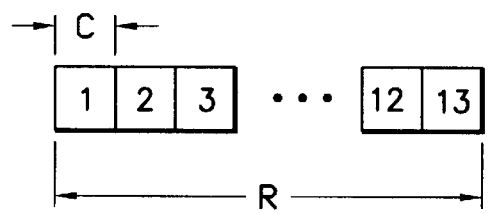
FIG. 6 depicts frequency channelization for the user terminal-satellite band of a typical mobile satellite service.

Briefly referring to FIG. 6, with regards to a CDMA MSS system, the satellite 14 is responsive to specific frequency channels C within the L-band sub-range R. As shown, there may be currently 13 channels within the L-band sub-range R of 16.5 MHz. Channel 1 is designated as 1610.7 MHz. Each channel has a bandwidth of 1.23 MHz, thus channel 13 is designated as 1625.8 MHz.

Turning back to FIG. 1, in operation the satellite 14 receives L-band information from within the L-band footprint 18a. As previously described the source of the L-band information may be a desirable signal from any one of several user terminals 32 or a source of interference such as the L-band emitter 30. The desired signal source of the user terminal 32 may represent, for example, a satellite user terminal whose transmission may be adversely affected by the L-band emitter 30, which appears as a source of interference. The L-band signal received by the satellite 14 is then transmitted to the antenna 20a, modulated on an appropriate frequency in the C-band range, where each beam 26 of the L-band footprint 18a is separately processed at the gateway 20. In a preferred embodiment, the gateway 20 uses the processed L-band information to create an RF interference contour map corresponding to the L-band footprint 18a. As stated above, it is desirable to determine the extent of which the interference is created by the L-band emitter 30.

As an illustration, assume that the C-band power measurements are being made when the system 10 is operating with light traffic loading. If there is one channel, typically 1.23 MHz wide, out of the allocated 16.5 MHz band that is unused by a user terminal 32 transmitting a desired signal, then any 'signal' measured at the gateway 20 in that channel would be due to the combination of thermal noise, emissions at L-band collected by the satellite 14, and C-band interference, represented by arrows 34, where the C-band interference 34 is due to extraneous energy collected by the gateway 20 antenna 20a at the feederlink signal 22a frequency. By calculating the noise contribution from known system and environmental noise sources, the interference in that channel due to emitters 30 in the satellite beam 26 being processed at the gateway 20 can be calculated. The C-band interference 34 corresponding to the feederlink signal 22a frequency can be estimated by attaching a spectrum analyzer to the gateway 20 receiving antenna 20a when the antenna 20a is not pointing at the satellite 14. After subtracting the noise and feederlink signal 22a contributions, the remainder may be assumed to be due only to L-band emitters 30 in the satellite beam 26.

When the system 10 is fully operational, that is during normal operations, it may not be possible to find a 1.23 MHz channel that is unoccupied by user terminal 32 traffic. In this case, it is possible to calculate the contribution of the desired user terminal 32 traffic to the total uplink power and subtract it out. The contribution of the user terminal 32 traffic at each time instant is calculated at the gateway 20 from operating system parameters available to the gateway 20, and the number and location of users represented by the user terminals 32 being served by the gateway 20. User terminal 32 location is obtained as part of the position location service that will be offered by most of the MSS operators. Thus, the signals associated with each user terminal 32 can be subtracted from the initial C-band power measurement to reveal the existence of L-band emitters 30 in a given beam 26.

Since user terminal 32 position information is available for the analysis performed by the map generating system 10, the fact that satellite 14 is a non-GSO satellite does not impact the ability of the gateway 20 to determine the location of the emitter 30. As the L-band footprint 18a moves with respect to the surface of the Earth all user terminals 32, including handheld mobile terminals 32a and stationary terminals 32b, along with L-band emitters 30, will appear to be in motion with respect to a given beam 26. The method of the map generating system 10, however, dynamically maps the quasi-movement of the user terminals 32 and emitters 30.

Figure 2:
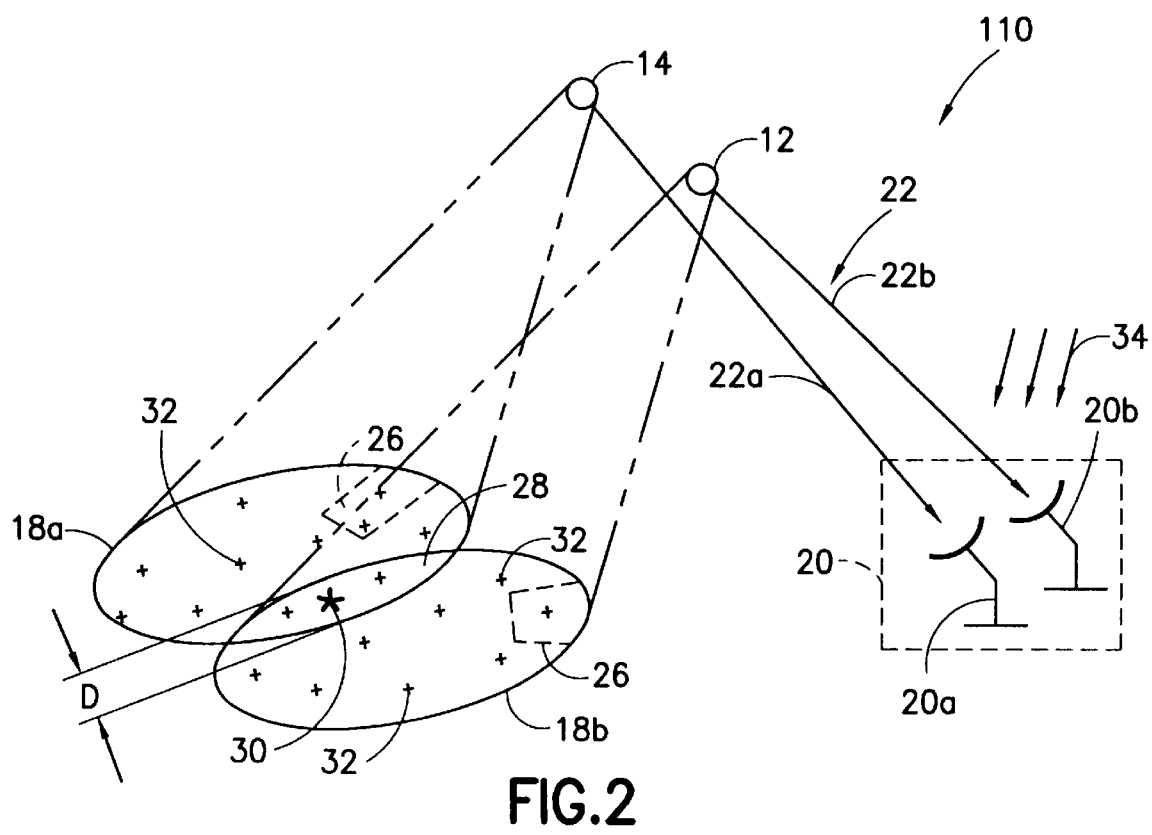
FIG. 2 depicts the geometry of a radio frequency map generating system comprising at least two satellites in accordance with this invention.

Now turning to FIG. 2, a system 110 providing a more precise method for determining the location of an undesirable L-band emitter 30 is shown. The system 110 comprises at least two non-GSO satellites. More specifically, the satellite 14 and a satellite 12 of a non-GSO constellation are shown. The satellite 14 has an operational zone of coverage defined by the L- band footprint 18a. Similarly, the satellite 12 has an operational zone of coverage defined by an L-band footprint 18b. The gateway 20 comprises several high-gain antennas such as the antenna 20a and an antenna 20b. Each antenna tracks a separate feederlink signal 22 from satellites 12 and 14. The feederlink signal 22a corresponds to a signal transmitted from the satellite 14 to the antenna 20a. Additionally, a feederlink signal 22b corresponds to a signal transmitted from the satellite 12 to the antenna 20b. As described above, each satellite's L-band footprint 18a, 18b, is made up of individual beams such as 26, and the signal from each such beam 26 is separately processed at the gateway 20. The L-band emitter 30 is shown in a region 28 where the two satellite footprints 18a, 18b overlap. At the time instant shown, this overlap region has a dimension shown as D. As the non-GSO satellites 12, 14 move off in different orbital planes, the overlap region 28 changes in size and shape in a manner that is predictable at the gateway 20. Desired signal sources provided by user terminals 32 represent users in the system, who may or may not be in the same frequency channel as the emitter 30. Also shown is the external interference 34 at C-band that is picked up by the gateway 20 antenna (20a, 20b) sidelobes. Because of the directivity of the gateway 20 antennas 20a, 20b, the level of C-band interference 34 picked up by the antennas 20a, 20b is typically small relative to the feederlink energy.

Since each satellite 12, 14 typically has many beams 26 that cover a portion of the Earth's surface, a certain amount of localization of the interference emitter 30 occurs immediately. Further narrowing of the position of the interference emitter 30, however, can be obtained by correlating, at the gateway 20 or a system network control center, the received power from the satellites 12, 14 of the system 110, given that the gateway 20 knows the satellite 12, 14 antenna patterns at L-band and C-band. In effect, this is a form of triangulation to more accurately determine the location of the interferer emitter 30. As the satellites 12, 14 move they cover different areas of the surface of the Earth. Since the gateway 20 has knowledge of the satellite 12, 14 locations and the positions of the user terminals 32, as discussed above, it is possible to map the area swept by the satellite 12, 14 beams 26, determining the location of the interferer emitter 30 more accurately. By making measurements in different L-band channels, interferer emitters 30 in the entire 16.5 MHz band can be mapped.

Figure 3:
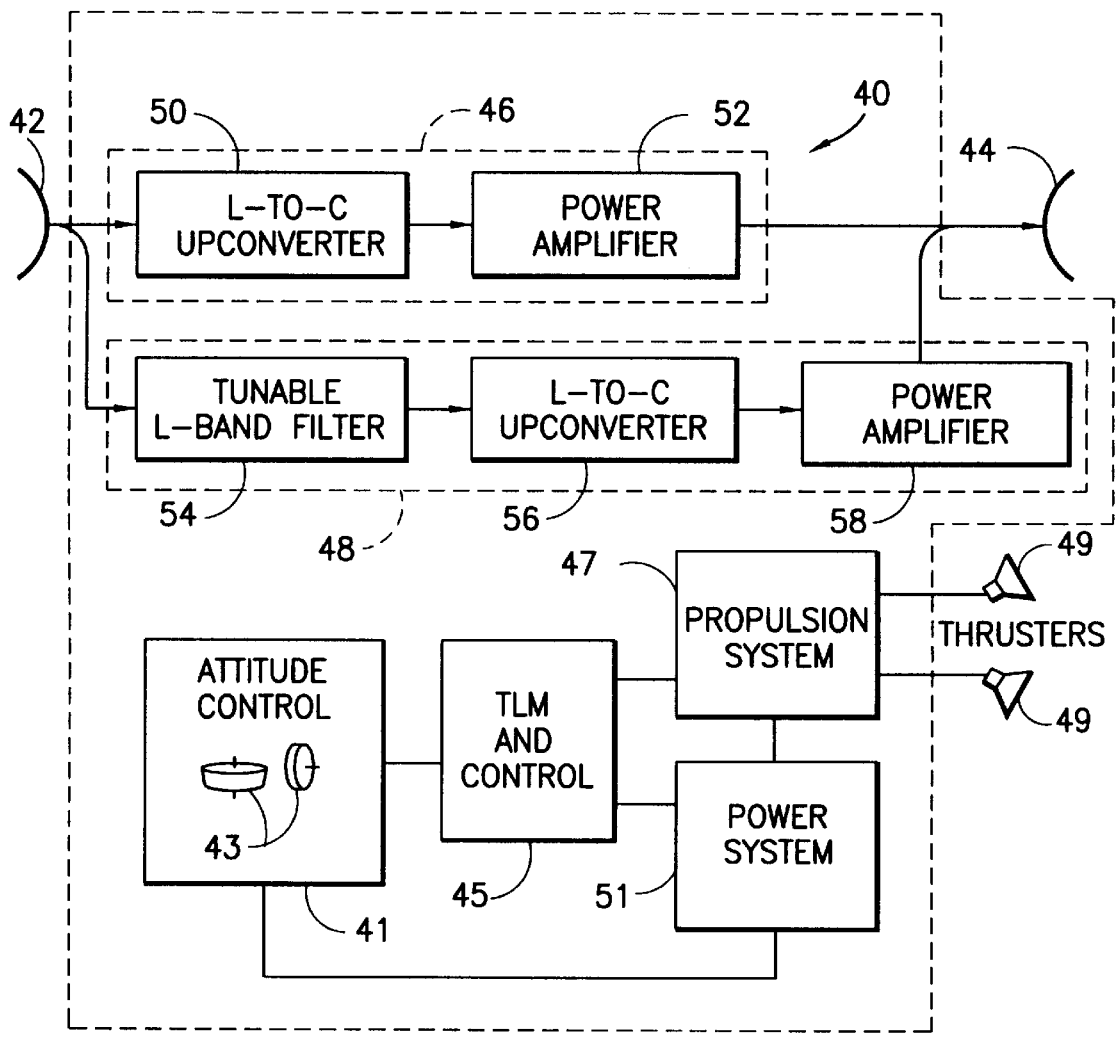
FIG. 3 is a block diagram depicting the payload of a satellite as part of a radio frequency map generating system.

Referring to FIG. 3 a satellite 12, 14 payload 40 in accordance with a preferred embodiment is shown. The payload 40 comprises a multi-beam L-band antenna 42, a C-band antenna 44 and two transponders: a first transponder 46 suitable for the MSS function and a second transponder 48. The first transponder 46 is used to obtain an RF map of the world at 1610–1626.5 MHz and further comprises an L-to-C upconverter 50 and a corresponding power amplifier 52. The second transponder 48 is tunable in the L-band and thus can be used to monitor and map the rest of the L-band frequency range. The second transponder 48 comprises a tunable L-band filter 54, an L-to-C upconverter 56 and a corresponding power amplifier 58. Since no L-band signal is being emitted by the transponder 48 in the remaining portion of the L-band, no regulatory license is needed to modify the MSS payload by adding the transponder 48 to the satellite 12, 14. The incoming L-band signals are amplified by the multi-beam L-band antenna 42 and the feederlink signals 22 are transmitted by the low-gain global-coverage C-band antenna 44. The feederlink 22 sub-band on which the satellite 12, 14 transmits is different for each uplink L-band beam. Note that it is possible to provide the transponder 48 with a tunable filter 54a (not shown) which passes frequencies of other bands of interest or to add another transponder 48a (not shown) to the satellite 12, 14 payload, tunable to any other uplink frequency while using the same satellite-gateway frequency as the example system 110, and map the RFI in that uplink frequency band.

Further precision may be had by maneuvering the satellite 12, 14 using an attitude central system 41 and momentum wheels 43, or by steering the satellite 12, 14 using thrusters 49 and propulsion system 47. A telemetry (TLM) and control system 45 can be used to direct the satellite antennas 42, 44 in a pattern so as to isolate the interference source 30. A conventional power system 51 provides operating power for all of the illustrated satellite components.

Figure 4:
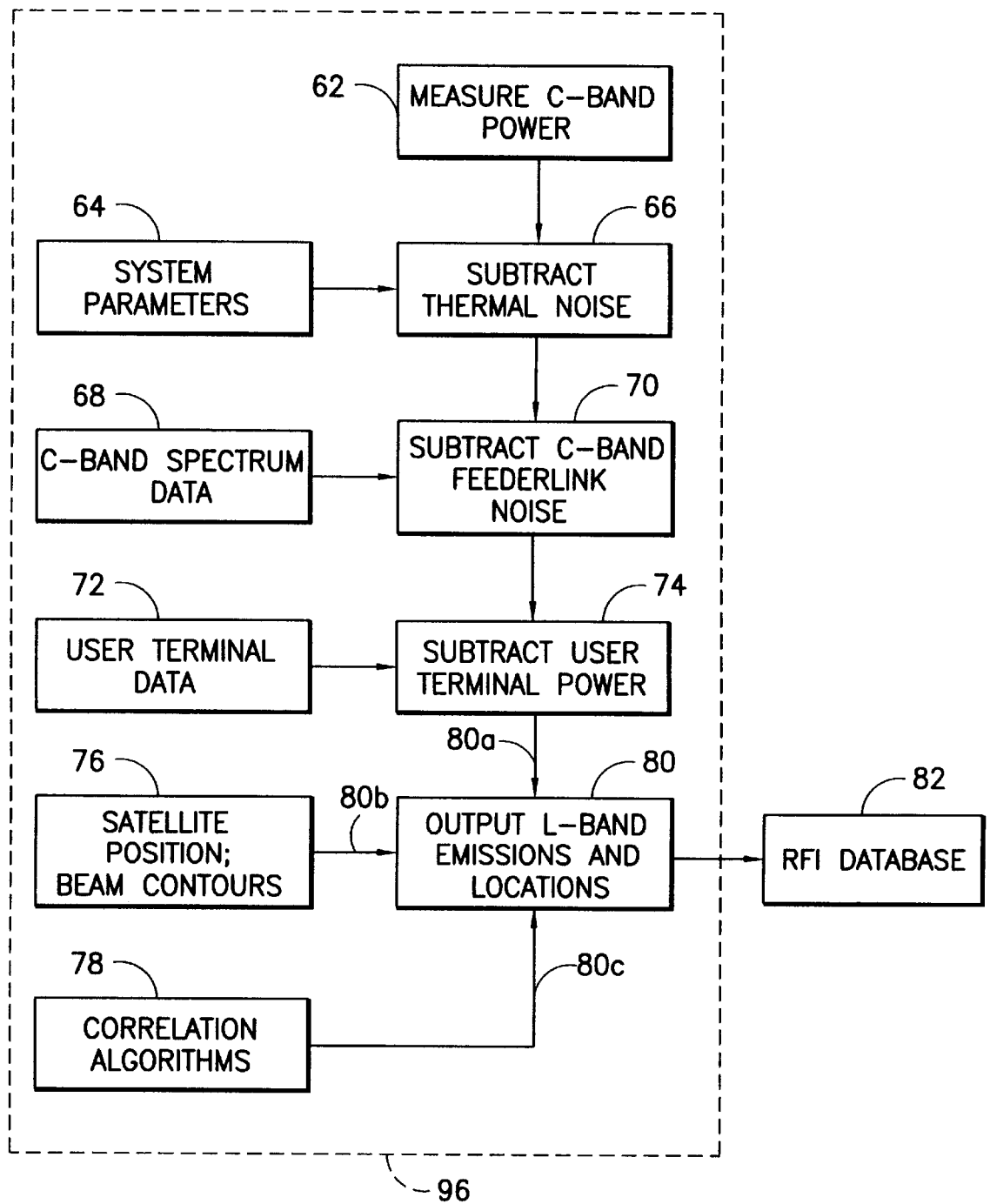
FIG. 4 is a block diagram depicting processing functions to be used by a gateway for generating a radio frequency map in accordance with this invention.

Now turning to FIG. 4, a block diagram depicting processing functions to be used by each gateway 20 for generating an RF interference map in accordance with this invention is shown. In an initial step 62 C-band power is measured in the received feederlink signal 22 which corresponds to a particular beam 26 of a particular L-band footprint 18. In a step 64 the gateway 20 obtains various system parameter information from which a power component related to thermal noise can be subtracted in a step 66 from the measured C-band power resulting from the step 62. In a step 68 the C-band power spectrum data is obtained with the aid of a spectrum analyzer or other suitable device, as previously discussed, and then subtracted from the result of the step 66 in a step 70. Additionally, user terminal 32 data representing known locations of currently active user terminals 32 is obtained in a step 72 and subtracted from the resultant of the step 70 in a step 74. The resulting power measurement 80a is provided to a step 80 as a resultant from the step 74. It is important to note that the order of the steps 66, 70, and 74 may be interchanged since they are not dependent on the determination of each other. Thus, the step 70 could be performed subsequent to the step 62 and prior to the step 66.

In a step 76 satellite 12, 14 position information and corresponding beam 26 contour data are obtained providing an input 80b to the step 80. Additionally, in a step 78 satellite information from several satellites, regarding areas where the L-band footprint 18 of at least two satellites overlap, is correlated and provided as an input 80c to the step 80. In the step 80 undesirable L-band emitter 30 signal power and location information is determined for every L-band emitter in current beam 26 and then stored in an RFI database in a step 82. The steps 62 through 80 further define a unified step 96 shown in dashed line. The RFI database defines a radio frequency map, more specifically a radio frequency interference map, wherein L-band interference sources may be identified as to terrestrial location. As previously mentioned, it should be understood that while a standard MSS system satellite 12, 14 using the defined L-band range of 1610–1626.5 MHz for communications received from a user terminal 32, the same method can be applied to RF mapping of the world using other GSO or non-GSO constellations operating in other frequency bands.

If the system 10 uses distributed control, where a number of gateways 20 communicate as a single unit and control a number of satellites, some of these functions can be performed at each gateway 20. However, if the network architecture uses central control, these functions could be performed at the network control center (not shown). In any case, the system 10 maintains statistics on the interference emitter 30 power it received in each channel C in each beam 26 at each time-step, typically a minute. By compiling, at a central location, the history of data from different gateways 20, high resolution, spatial and temporal, world-wide radio frequency spectrum maps can be generated.

In accordance with an aspect of this invention the gateway 20 and/or the central network control center of an MSS system can use the RFI map defined by the step 82 to optimize its use of limited system resources, such as frequencies and satellite power. In particular, knowledge of external interference as a function of time and space can be used by the gateway 20 or network control center to assign mobile and handheld user terminals 32a to frequency channels that have relatively low interference, and fixed user terminals 32b (e.g. phone booths on remote roads or villages that make use of the MSS) to those with higher interference. This is useful because mobile and handheld user terminals 32a typically have lower power transmitters and lower gain antennas than fixed user terminals 32b. Therefore fixed user terminals 32b can operate at the higher EIRP levels needed to overcome the interference in noisier channels. Such an assignment of frequency channels enables the system 10 to serve a larger total number of user terminals 32.

Reallocation of user terminal 32 frequency channels C can be achieved predictably or dynamically. If the L-band emitter 30 signal interference is found to be predictable, channel reallocation for any given time period may be provided in advance. For example, if an L-band emitter 30 is consistently active during a specific daily time period, reallocation of channel frequencies can be made automatic for this time period. If the L-band emitter 30 signal interference is not predictable, a dynamic channel reallocation of users is possible at the gateway 20 using sufficiently fast processors. Also, note again that the use of this method is not restricted to CDMA systems. This method could be used for time division multiple access (TDMA) systems, and for Frequency Division, Multiple Access (FDMA) systems.

Figure 5:
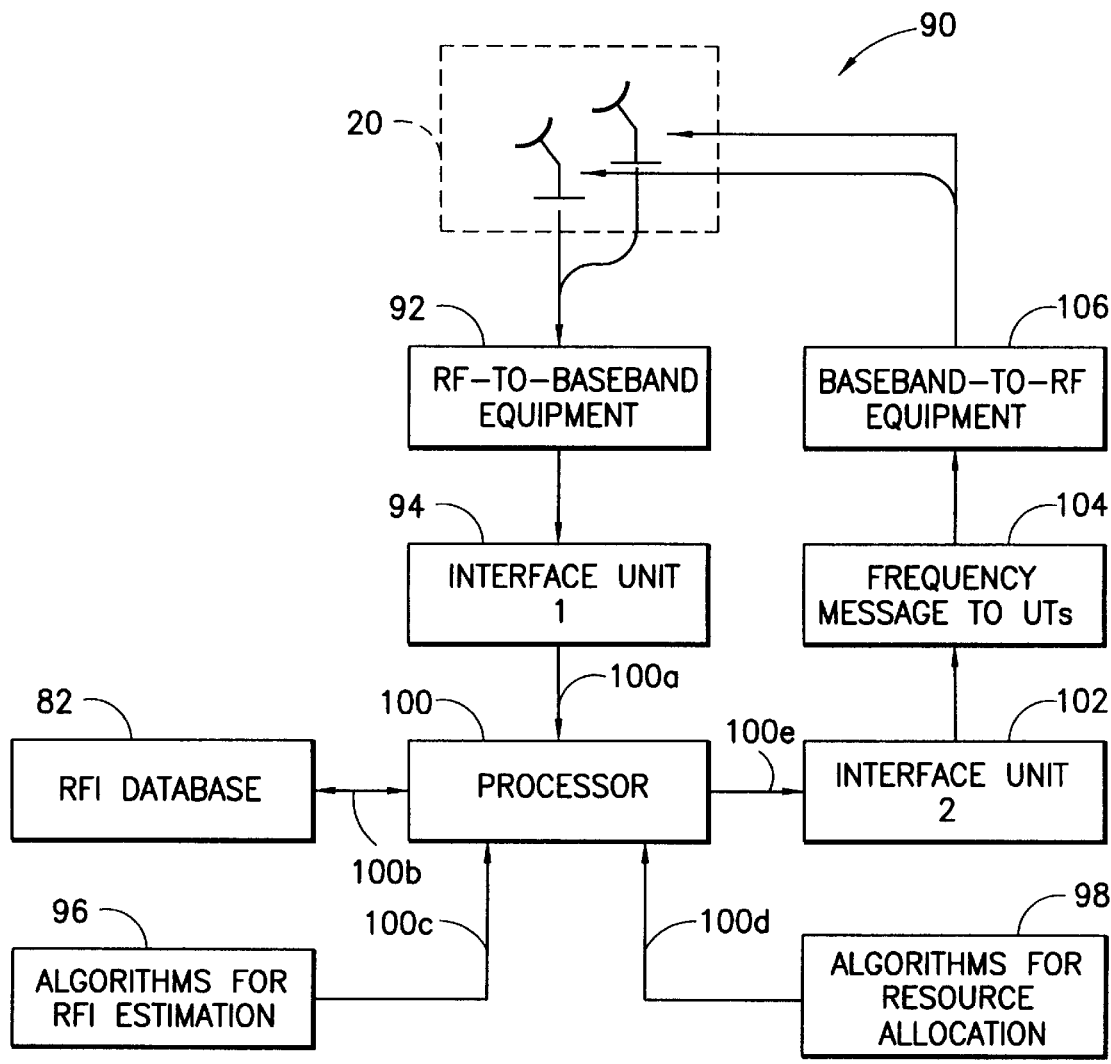
FIG. 5 is a block diagram depicting processing functions to be used by a gateway for reallocating operating frequencies of user terminals.

Now turning to FIG. 5, gateway 20 procedures for an examplary MSS system 90 using the radio frequency interference database stored in the step 82 for channel c frequency reallocation is shown. The C-band signal received at the gateway 20 is demodulated in the gateway 20 RF equipment during a step 92. The baseband output from this equipment is formatted in a first interface unit during a step 94 and then provided as an input 100a to a processor. In the step 96 the processor performs the algorithms for calculating the radio frequency interference as shown in FIG. 4 and provides the calculation as an input 100c to the processor. In a step 98 the processor performs a desired technique for resource allocation. The processor 100 generates and stores the RFI database in the step 82 as previously discussed. The processor 100 later uses the stored RFI database 82 as an input 100b along with the resource allocation algorithms of the step 98, as an input 100d, to determine the channel frequency reallocation. In a step 102 a second interface unit reformats the processor output 100e and converts it into a user terminal 32 frequency channel assignment message in a step 104. The frequency channel assignment message is provided to a baseband-to-RF converter in a step 106 and radiated by the gateway 20 antennas, finally reaching the user terminal 32. In response, the UT(s) shift their transmitter frequencies accordingly.

This scheme for frequency reallocation after RFI mapping applies to any system that divides its allocated bandwidth into multiple frequency channels; each of these channels may accommodate signals from multiple user terminals 32 by using either CDMA, TDMA, or any other multiple access scheme.

Figure 7:
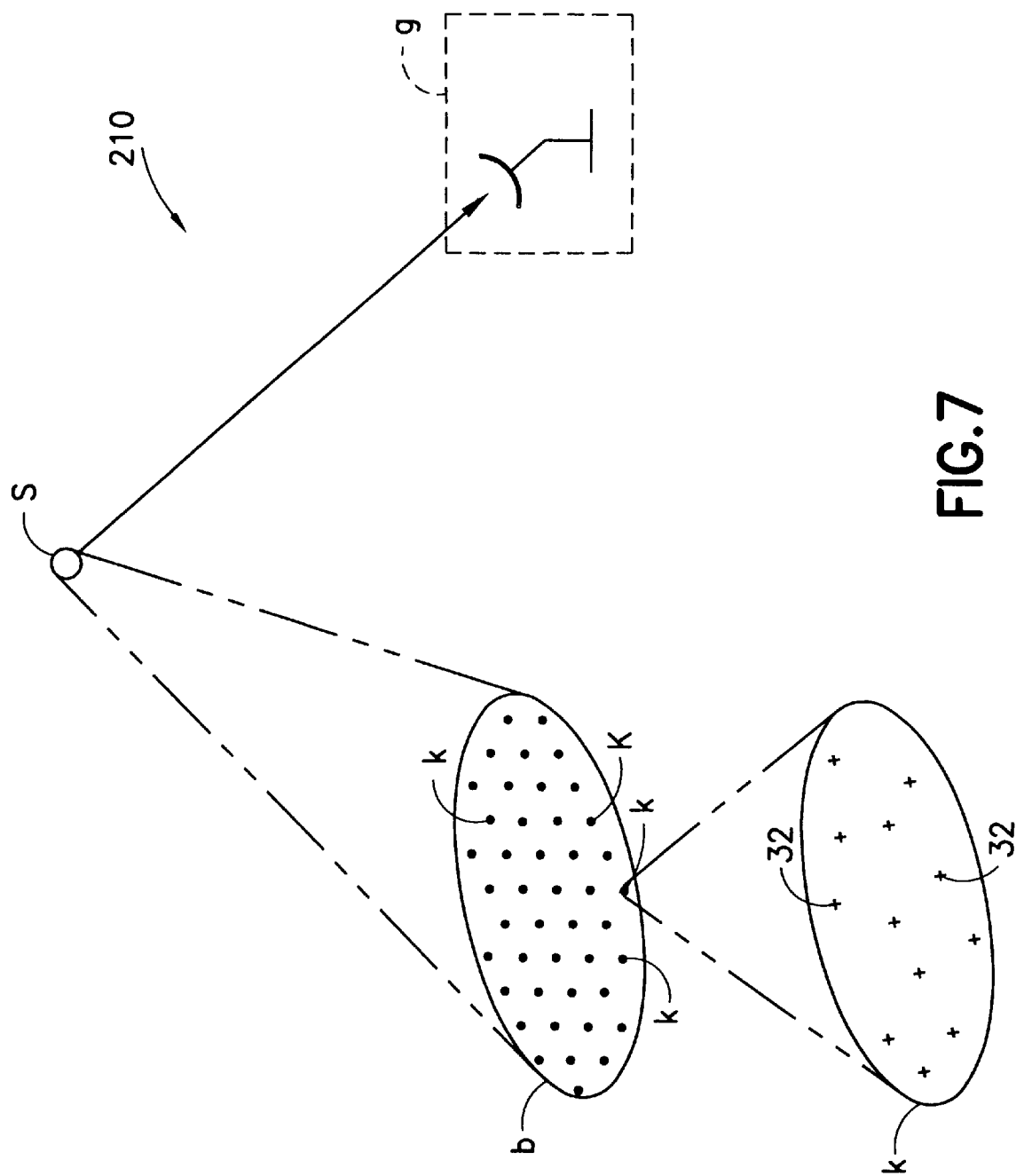
FIG. 7 depicts the gateway/satellite/user terminal geometry for resource allocation calculations.

With reference to FIG. 6 and FIG. 7, the frequency reallocation scheme for an example MSS system 210 using multiple CDMA channels is described in more detail. More specifically, FIG. 7 shows the system 210 comprising a gateway g, a satellite s, an L-band beam b, and a number of traffic concentrator gridpoints k. Each gridpoint k is further comprised of at least one user terminal 32. The system 210 can be modeled by covering the world with a set of gridpoints k, and assuming user terminals 32 to be grouped into the traffic concentrations at each gridpoint k. FIG. 7 shows user terminals 32 located at gridpoints k covered by a single beam b of a satellite s, and the gateway g processing the signal from this beam b of the satellite s.

The MSS system bandwidth of 1610.7–1625.8 MHz in the example system 210 is divided into the 13 channels C, each of them 1.23 MHz wide. Each of these 13 channels C is reused in each L-band beam of the satellite, as shown in FIG. 6. Several user terminals 32 are assigned to each channel C and share the channel using CDMA. A gateway g sends power control messages to each user terminal 32 to set its transmit power to just equal the value required to maintain a particular signal-to-noise-plus-interference ratio (SNIR) given by $E_b|N_{t,reqd}$.

The gateway g and/or the network control center performs the resource allocation by performing a time-step by time-step simulation of the entire system 210.

At time-step t, let $Y_{kc}$=the transmitter output power of a user terminal 32 at the $k^{th}$ gridpoint traffic concentrator in a channel c.

The fact that the user terminal 32 power is limited is expressed by the following constraint:

L-band user terminal 32 transmit power limit:

$$\forall k,c: Y_{kc}|W_{kc} \leq P_{xmtuser} \qquad (1)$$

where $W_{kc}$ is the number of circuits at traffic concentrator gridpoint k to be supported by the channel c on the return link, and $P_{xmtuser}$ is the user transmit power limit, which is about 1 or 2 watts for hand-held devices, approximately 3 watts for mobile devices, and approximately 10 watts for fixed terminals (all of these values are exemplary).

The SNIR for each UT-satellite-gateway link can be expressed using the equations given below.

For each gridpoint k, gateway g, satellite s, beam b, channel c, and for each $v_{sk}$ that is non-zero (where $v_{sk}$ has a value of 1 if gridpoint k sees satellite s and a value of zero otherwise):

$$E_b|_{ksbgc} = \qquad (2)$$

$$T_{bit}\frac{y_{kc}}{W_{kc}} \frac{G_{ks}^{UTant} G_{sbk}^{Lrxant} G_{sb}^{LCxpdr} G_{sg}^{Ctxant} G_{g}^{Crcv}}{L_{ks}^{path} L_{ks}^{misc} L_{sg}^{path} L_{sg}^{misc}} = T_{bit}\frac{y_{kc}}{W_{kc}} C_{ksbg}^{user \rightarrow GW}$$

$$N_t|_{ksbgc} = N_{t,reqd} = N_o + I_{ext,c} + T_{chip}\sum_{k'=1}^{K} y_{k',c} C_{k'sbg}^{user \rightarrow GW} v_{sk'} \qquad (3)$$

In these equations, $N_o$ is the total thermal noise due to both uplink and downlink paths, measured at the gateway receiver;

K=total number of gridpoints in the satellite footprint.

$I_{ext,c}$=external interference density in channel c as measured at the gateway receiver;

$G_{ks}^{UTant}$=UT antenna gain at the $k^{th}$ traffic concentration in the direction of satellite s;

$G_{sbk}^{Lrxant}$=satellite L-band receive antenna gain for beam b of satellite s for traffic concentration k;

$G_{sb}^{LCxpdr}$=gain for the L-to-C transponder for beam b of satellite s;

$G_{sg}^{Ctxant}$=C-band transmit antenna gain from satellite s toward gateway g;

$G_{g}^{Crcv}$=C-band receive antenna gain of gateway g;

$L_{ks}^{path}$=free space path loss from traffic concentration k to satellite s;

$L_{ks}^{misc}$=the miscellaneous path loss (antenna pointing, polarization loss) from traffic concentration k to satellite s;

$L_{sg}^{path}$=free space path loss from satellite s to gateway g;

$L_{sg}^{misc}$=the miscellaneous path loss (tracking, polarization and rain loss) from satellite s towards gateway g;

$C_{ksbg}^{user \rightarrow GW}$=total gain encountered by a signal in going from a user at k to gateway g via beam b of satellite s, as defined by Eq. (5);

$T_{bit}$=bit time, which is the reciprocal of data rate; and
$T_{chip}$=chip time, which is the reciprocal of chip rate (1.23 MHz).

To meet the desired result $E_b|N_{t,reqd}$ we have, from Eqs. (2) and (3), $$E_b/N_{t,reqd} = \frac{T_{bit}\frac{y_{kc}}{w_{kc}}C_{ksbg}^{user \to GW}}{N_0 + I_{ext,c} + T_{chip}\sum_{k'=1}^{K} y_{k'c}C_{k'sbg}^{user \to GW}v_{sk'}} \quad (4)$$

It can thus be understood that the total noise power density at the gateway g is the thermal noise $N_o$, external interference $I_{ext,c}$ and system self-interference given by the summation term. This summation term is dependent on the powers $Y_{k'c}$ due to each user terminal 32 that is visible to the satellite 32, weighted by the satellite s beam b antenna gain and the user terminal 32 gain along the path from that user terminal 32 to the satellite s. The satellite s antenna gain for beam b is large for gridpoints k' close to the peak of the beam b, and is decreased at gridpoints k' that are further away from the beam b peak; for generality, the beam b is assumed to have non-zero gain at all gridpoints k visible to the satellite s.

Other system constraints, such as total satellite s power consumed and power flux density limits on the ground, are also expressible in terms of linear combinations of the $Y_{kc}$ variables.

The resource allocation algorithms in the gateway g involve, at each time t, solving for the $Y_{kc}$ that satisfy Eqs. (1), (4) and all other constraints using techniques such as iteration, or numerical methods or linear programming; the objective of the resource allocation is usually to maximize the sum of all user terminals 32 served, expressed by $$W = \sum_{k,c} w_{kc} \quad (5)$$

which represents the system capacity.

One of the challenges in the resource allocation is to assign user terminals 32 to channels C in an efficient manner. As Eq. (4) shows, users in channels that have high external interference $I_{ext,c}$ need higher transmit power values $Y_{kc}$ than those in channels C with lower external interference $I_{ext,c}$. Since fixed user terminals 32b typically have higher EIRP limits than mobile and handheld user terminals 32a, one preferred channel assignment rule at the gateway g is to assign fixed user terminals 32b to those channels that it knows to have high external interference $I_{ext,c}$, and to reserve the channels with low external interference $I_{ext,c}$ for mobile and handheld user terminals 32a.

It should be realized that the map generating system 10 could also be used to map specific areas of space by simply directing a receiving antenna of the satellite 14 at the desired area and providing a transponder as part of the satellite 14 with the appropriate tuning capabilities. Additionally, while the method disclosed can be performed by a single satellite, a GSO or non-GSO satellite, the method is not limited to a specific number of satellites, GSO or non-GSO satellites, or a combination of both.

It should also be realized that the various frequency bands, numbers of channels, channel bandwidths and the like are exemplary, and are not to read in a limiting sense.

Thus, while the invention has been particularly shown and described with respect to preferred embodiments thereof, it will be understood by those skilled in the art that changes in form and details may be made therein without departing from the scope and spirit of the invention.

What is claimed is:

1. A method for generating a radio frequency map comprising the steps of:

measuring received frequency power spectrum values corresponding to a specific location;

calculating interference errors;

subtracting said interference errors from said power measurement, wherein a resultant radio frequency interference value is calculated; and storing said resultant radio frequency interference value in a database, wherein said stored value is electronically accessible and retrieved for making frequency channel assignments, wherein the step of measuring received frequency power spectrum values comprises receiving C-band frequency power spectrum values corresponding to an L-band beam of a satellite footprint;

further comprising the step of selecting additional L-band beams of said satellite footprint, wherein a resultant radio frequency interference value is calculated for every L-band beam as part of said L-band footprint of said satellite;

and further comprising the step of selecting additional L-band footprints each of said additional L-band footprints defining a different location, wherein a resultant radio frequency interference value is calculated for every L-band beam as part of every L-band footprint;

wherein the step of calculating interference errors further comprises the steps of calculating a thermal noise interference error; calculating a C-band feederlink interference error; and calculating a user terminal interference error;

wherein the step of calculating a user terminal interference error further comprises the step of determining the number and location of said user terminals being served by said gateway, wherein the signals generated by said user terminals define said user terminal interference error;

and further comprising the step of reallocating said user terminal channel of operation wherein the power usage of said user terminal is reduced while a minimum signal-to-noise-interference ratio is maintained, said ratio being defined as:

$$E_b/N_{t,reqd} = \frac{T_{bit}\frac{y_{kc}}{w_{kc}}C_{ksbg}^{user \to GW}}{N_0 + I_{ext,c} + T_{chip}\sum_{k'=1}^{K} y_{k'c}C_{k'sbg}^{user \to GW}v_{sk'}}$$

where $Y_{kc}$=the transmitter output power of said user terminal at a $k^{th}$ gridpoint traffic concentrator in said channel;

$W_{kc}$=is the number of said user terminals at a traffic concentrator gridpoint k to be supported by said channel;

$N_o$=is the total thermal noise due to both uplink and downlink paths, measured at the gateway receiver;

$I_{ext,c}$=external interference density in channel c as measured at the gateway receiver;

$C_{Ksbg}^{user \to GW}$=total gain encountered by a signal in going from a user at k to gateway g via beam b of satellite s;

$T_{bit}$=bit time, which is the reciprocal of data rate; and $T_{chip}$=chip time, which is the reciprocal of chip rate.

2. A method as set forth in claim 1, wherein the step of calculating a C-band feederlink interference error further comprises the steps of:

directing a gateway antenna away from said satellite; and measuring the frequency power spectrum values of a signal received by said gateway, wherein said measurements define said C-band feederlink interference error.

3. A method as in claim 1, wherein the step of reallocating a user terminal channel of operation further comprises the steps of:

recalling said stored resultant values;

comparing a current frequency of operation of said user terminal with said resultant values;

determining a new frequency channel of operation within said channel thereby conserving power of said user terminal; and sending a frequency channel assignment message to said user terminal wherein said frequency selection message instructs said user terminal.

4. A radio frequency map generating system comprising:

at least one satellite having a coverage area, said coverage area further comprising a plurality of beams, said at least one satellite comprising a first transponder;

at least one user terminal within said coverage area of said at least one satellite, said user terminal communicating with said at least one satellite; and at least one gateway having at least one communication antenna for communicating with said at least one user terminal via said at least one satellite, wherein said first transponder of said at least one satellite is responsive to a plurality of received signals, desirable and undesirable, within the operating frequency range of said at least one user terminal, said plurality of received signals emanating from said coverage area, said at least one satellite transmitting said received signals to said gateway; wherein said at least one gateway is responsive to said received signals for generating a database, said database defining a radio frequency map wherein said gateway assigns or reassigns said at least one user terminal to a frequency channel selected by said gateway for reducing an amount of power required to provide a desired quality of service to said at least one user terminal;

wherein the power usage of said user terminal is reduced while a minimum signal-to-noise-interference ratio is maintained said ratio being defined as:

$$E_b/N_{t,reqd} = \frac{T_{bit}\frac{y_{kc}}{W_{kc}}C_{ksbg}^{user \to GW}}{N_0 + I_{ext,c} + T_{chip}\sum_{k'=1}^{K} y_{k',c}C_{k'sbg}^{user \to GW} v_{sk'}}$$

where $Y_{kc}$=the transmitter output power of said user terminal at a $k^{th}$ gridpoint traffic concentrator in said channel;

$W_{kc}$=is the number of said user terminals at a traffic concentrator gridpoint k to be supported by said channel;

$N_o$=is a total thermal noise due to both uplink and downlink paths, measured at a gateway receiver;

$I_{ext,c}$=external interference density in channel c as measured at the gateway receiver;

$C_{Ksbg}^{user \to GW}$=total gain encountered by a signal in going from a user at k to gateway g via beam b of satellite s;

$T_{bit}$=bit time, which is the reciprocal of data rate; and $T_{chip}$=chip time, which is the reciprocal of chip rate.

5. A radio frequency map generating system as set forth in claim 4 wherein said at least one satellite is a geostationary satellite wherein said coverage area of said at least one satellite is constant with respect to the Earth and wherein said radio frequency map generated by said at least one gateway represents at least a portion of the surface area of the Earth, a portion of said radio frequency map corresponding to said converge area of said at least one satellite being dynamically updated.

6. A radio frequency map generating system as set forth in claim 4 wherein said at least one satellite is a non-geostationary satellite wherein said coverage area of said at least one satellite moves with respect to the Earth and wherein said radio frequency map generated by said at least one gateway represents at least a portion of the surface area of the Earth, a portion of said radio frequency map corresponding to said moving converge area being dynamically updated.

7. A radio frequency map generating system as set forth in claim 4 wherein said at least one satellite further comprises at least one additional transponder in addition to said first transponder, said at least one additional transponder being tunable within a desired frequency range, wherein said database generated by said gateway defines a radio frequency map covering a frequency range that corresponds to said desired frequency range.

8. A radio frequency map generating system as set forth in claim 4 further comprising a network control center, said network control center communicating with said at least one gateway wherein said database is generated in part by said network control center.

9. A radio frequency map generating system as set forth in claim 4 further comprising:

second satellite, said second satellite having a coverage area, said coverage area of said second satellite further comprising a plurality of beams, said second satellite comprising a first transponder;

a second user terminal within said coverage area of said second satellite;

a second communication antenna at said at least one gateway for communicating with said second user terminal via said second satellite, wherein said first transponder of said second satellite is responsive to a plurality of received signals, desirable and undesirable, within the operating frequency range of said second user terminal, said plurality of received signals emanating from said coverage area of said second satellite, said second satellite transmitting said received signals to said second communication antenna at said at least one gateway; wherein said at least one gateway is responsive to said received signals from said at least one satellite and said second satellite for generating said database, said database defining said radio frequency map.

10. A radio frequency map generating system as set forth in claim 9 wherein said coverage area of said at least one satellite moves with respect to said coverage area of said second satellite, said coverage area of said at least one satellite overlapping said coverage area of said second satellite, wherein said at least one gateway correlates said received signals from said at least one satellite corresponding to said overlapping coverage area with said signals received from said second satellite corresponding to said overlapping coverage area, wherein the accuracy of said database corresponding to said overlapping coverage area is increased.

11. A radio frequency map generating system as set forth in claim 9 further comprising a second gateway wherein said second communication antenna is part of said second gateway, said at least one gateway and said second gateway communicate wherein said at least one gateway generates said database, said database comprising said received signals from said second antenna at said second gateway.

12. A radio frequency map generating system as set forth in claim 11 wherein said database is generated at said second gateway, said database comprising said received signals from said at least one antenna at said at least one gateway, said database defining said radio frequency map.

* * * * *